(12) United States Patent
Park et al.

(10) Patent No.: US 9,351,095 B2
(45) Date of Patent: May 24, 2016

(54) TERMINAL APPARATUS AND METHOD FOR CONNECTING WITH A HEAD UNIT OF A VEHICLE

(71) Applicant: HYUNDAI MOTOR COMPANY, Seoul (KR)

(72) Inventors: Chan Seok Park, Gwangmyeong-Si (KR); Hyang Jin Kim, Gwangmyeong-Si (KR); Bo Geun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/295,142

(22) Filed: Jun. 3, 2014

(65) Prior Publication Data

US 2015/0172845 A1    Jun. 18, 2015

(30) Foreign Application Priority Data

Dec. 13, 2013    (KR) ........................ 10-2013-0155553

(51) Int. Cl.
| | | |
|---|---|---|
| H04M 3/42 | (2006.01) | |
| H04M 1/00 | (2006.01) | |
| H04M 3/00 | (2006.01) | |
| H04B 7/00 | (2006.01) | |
| G01M 17/00 | (2006.01) | |
| H04W 4/00 | (2009.01) | |
| H04W 12/06 | (2009.01) | |
| H04W 4/18 | (2009.01) | |

(52) U.S. Cl.
CPC .............. *H04W 4/001* (2013.01); *H04W 12/06* (2013.01); *H04W 4/18* (2013.01)

(58) Field of Classification Search
CPC ..................... A61B 5/0002; A61B 2560/0271; H04L 29/08108; H04M 2207/18
USPC ............ 455/557, 414.1, 418–420, 41.2–41.3, 455/550.1; 701/29.1, 31.4, 33.2
See application file for complete search history.

(56) References Cited

U.S. PATENT DOCUMENTS

| | | | |
|---|---|---|---|
| 6,732,031 B1 * | 5/2004 | Lightner et al. | ............. 701/31.4 |
| 2013/0106750 A1 * | 5/2013 | Kurosawa | ..................... 345/173 |
| 2013/0151064 A1 * | 6/2013 | Becker et al. | ................ 701/31.4 |
| 2013/0196646 A1 * | 8/2013 | Oh et al. | ........................ 455/418 |
| 2013/0265178 A1 * | 10/2013 | Tengler et al. | ................ 340/989 |

FOREIGN PATENT DOCUMENTS

| | | |
|---|---|---|
| KR | 10-2009-0125974 A | 12/2009 |
| KR | 10-2012-0039894 A | 4/2012 |

(Continued)

OTHER PUBLICATIONS

Korean Office Action dated Dec. 7, 2015 issued in Korean Patent Application No. 10-2013-0155553.

*Primary Examiner* — Dung Hong
(74) *Attorney, Agent, or Firm* — McDermott Will & Emery LLP

(57) ABSTRACT

A terminal apparatus for connecting with a head unit of a vehicle comprises a communicator configured to perform communication with the head unit equipped in the vehicle and a vehicle center server. A storage is configured to download an application from the vehicle center server and store it. A controller is configured to check information of the head unit by executing the application and execute a user interface corresponding to the checked information.

9 Claims, 4 Drawing Sheets

(56) References Cited

FOREIGN PATENT DOCUMENTS

| KR | 10-2012-0086580 A | 8/2012 |
| KR | 10-2012-0108763 A | 10/2012 |
| KR | 10-2012-0115827 A | 10/2012 |
| KR | 10-2013-0086756 A | 8/2013 |
| WO | 2013/079673 A1 | 6/2013 |
| WO | 2013/106329 A1 | 7/2013 |

* cited by examiner

TERMINAL APPARATUS AND METHOD FOR CONNECTING WITH A HEAD UNIT OF A VEHICLE

CROSS-REFERENCE TO RELATED APPLICATION

This application is based on and claims the benefit of priority to Korean Patent Application No. 10-2013-0155553, filed on Dec. 13, 2013 in the Korean Intellectual Property Office, the disclosure of which is incorporated herein in its entirety by reference.

TECHNICAL FIELD

The present disclosure relates to a terminal apparatus and a method for connecting with a head unit of a vehicle, and more particularly, to a terminal apparatus and a method for connecting with a head unit of a vehicle which can check information of a heterogeneous head unit in a smart phone by connecting the smart phone with the head unit.

BACKGROUND

Recently, in accordance with an ongoing development of the automotive industry and the electronics industry, various devices such as a head unit, a telematics device, an audio device, a navigation, etc are equipped in a vehicle in order to improve automobile performance and driver's convenience.

The head unit of these devices collects status information for all kind of electronic devices of various units inside the vehicle required for driving the vehicle, for example, an engine unit, a driving unit, an in-vehicle audio device, or the like and provides a driver with the status information. The driver checks vehicle performance through the head unit and inputs various control signals, and the head unit into which a control signal is inputted performs electronic equipment checking and controlling such as controlling the device corresponding to the control signal to improve the driver's convenience.

The above head unit is developed to improve driver's convenience by adding a navigation function or adding various additional functions through connecting with a portable device such as a smart phone. On the other hand, recently, the use of portable devices capable of telephony feature called the smart phone and a tablet PC, which download and install an application, is greatly increased.

SUMMARY

An aspect of the present disclosure provides a terminal apparatus and a method for connecting with a head unit of a vehicle which can check information of the head unit equipped in the vehicle by using an application installed on a smart phone.

Another aspect of the present disclosure provides a terminal apparatus and a method for connecting with a head unit of a vehicle which can check information of the head unit equipped in the vehicle irrespective of the connecting method with the head unit by using an application installed on a smart phone.

Another aspect of the present disclosure provides a terminal apparatus and a method for connecting with a head unit of a vehicle which can check information of a heterogeneous head unit by using an application installed on a smart phone.

A terminal apparatus for connecting with a head unit according to an exemplary embodiment of the present disclosure comprises a communicator configured to perform communication with the head unit equipped in the vehicle and a vehicle center server. A storage is configured to download an application from the vehicle center server and store it. A controller is configured to check information of the head unit by executing the application and execute a user interface corresponding to the checked information.

The controller may check information of the vehicle including vehicle identification number (VIN) of the vehicle.

The controller may check the information of the head unit including a type of the head unit and a connecting method with the head unit.

The controller may check a type of a protocol according to the type of the head unit, and checks a format of data according to the connecting method with the head unit.

The controller may execute a user interface corresponding to the information of the vehicle, the type of the protocol and the format of data.

The user interface may provide a separate function according to the type of the protocol and the format of data.

A method for connecting with a head unit of a vehicle according to another exemplary embodiment of the present disclosure comprises executing an application downloaded from a vehicle center server by a controller. A login is performed for the application. Information of the head unit is checked. A user interface corresponding to the checked information.

The step of checking the information of the head unit may further comprise checking whether the head unit is connected. The connecting method of the connected head unit is checked if the head unit is connected. A format of data is checked according to the connecting method.

The method may further comprise checking information of the vehicle and a type of the head unit previously stored in the vehicle center server if the head unit is not connected. A type of a protocol is checked according to the type of the head unit.

Before the step of executing the application, the method may comprise connecting to the vehicle center server and downloading the application. The application is installed and login information is generated. The information of the vehicle and the information of the head unit are transmitted.

The present disclosure has effects to improve driver's convenience by checking the information of the head unit irrespective of the connecting method with the head unit equipped in the vehicle and the type of the head unit using an application installed on a smart phone.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. However, in the following description of embodiments of the present disclosure, the explanation about technical information well known in the art and not directly related to the present disclosure may be omitted. It is intended to clearly deliver a main point of the present disclosure without obscuring the point by omitting unnecessary description.

Figure 1:
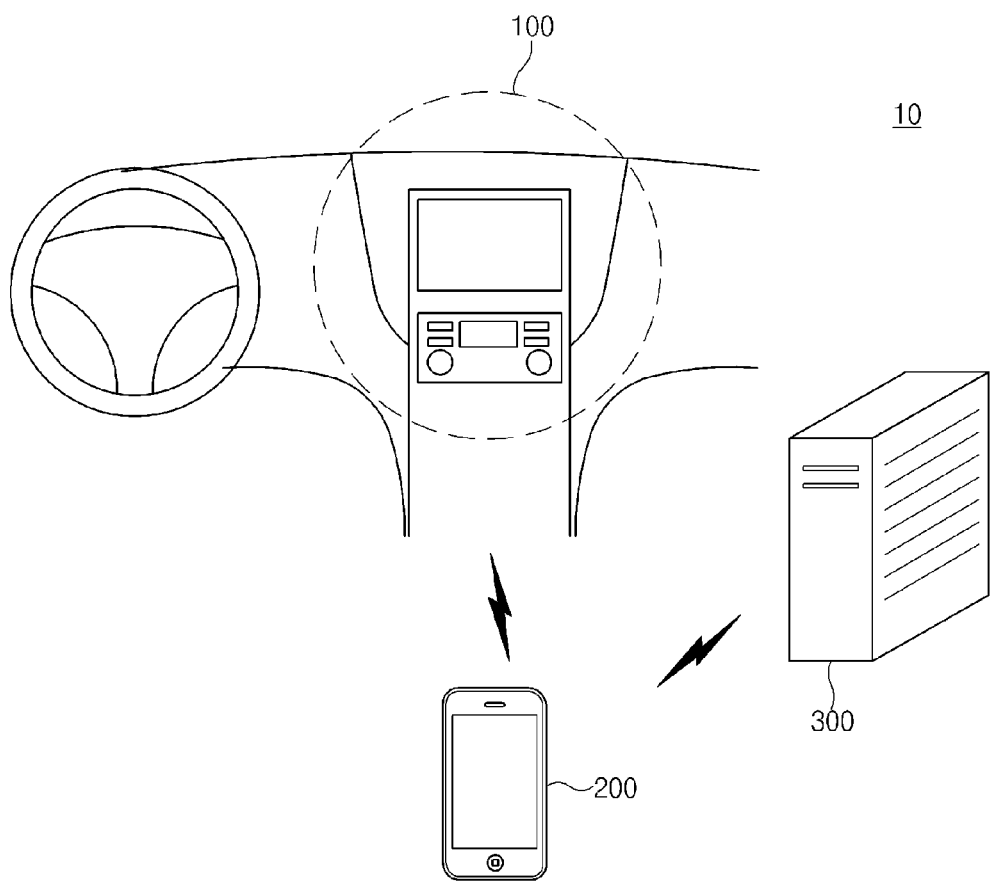
FIG. 1 is a configuration diagram showing an information check system capable of checking head unit information of a vehicle according to an embodiment of the present disclosure.
Figure 2:
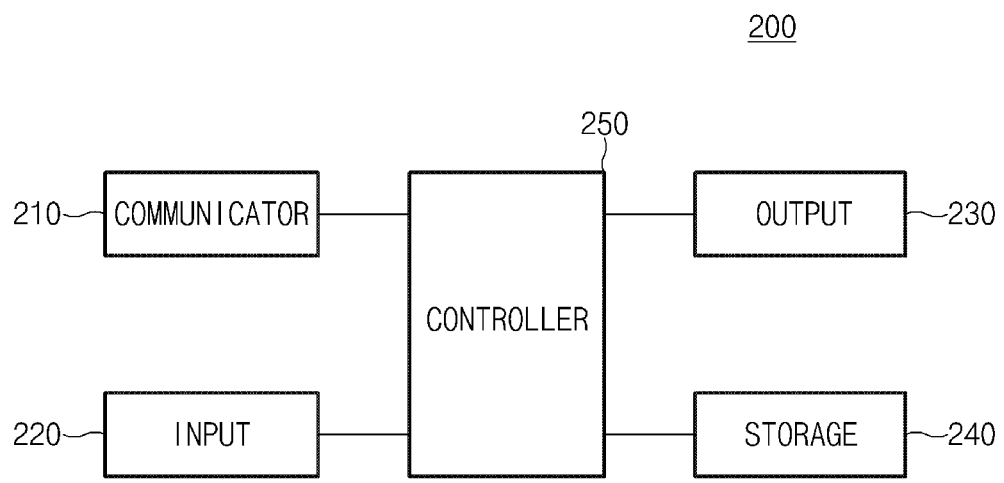
FIG. 2 is a block diagram showing a main configuration of a terminal apparatus according to an embodiment of the present disclosure.

FIG. 1 is a configuration diagram showing an information check system capable of checking head unit information of a vehicle according to an embodiment of the present disclosure. FIG. 2 is a block diagram showing a main configuration of a terminal apparatus according to an embodiment of the present disclosure.

Referring to FIGS. 1 and 2, an information check system 10 according to the present disclosure may include a head unit 100, a terminal apparatus 200, and a vehicle center server 300.

The head unit 100 is formed inside a vehicle as shown in FIG. 1 and collects status information for all kinds of electronic devices (various electronic devices including an engine unit, a driving unit, and an in-vehicle audio device) required for driving a vehicle and provides a driver with the status information. Furthermore, in the head unit 100, a type of a protocol used by connecting with the terminal apparatus 200 is varied according to a type of the head unit 100, and a format of data transmitted to and received from the terminal apparatus 200 is varied according to the connecting method with the terminal apparatus 200. The head unit 100 may be connected with the terminal apparatus 200 by wired communication such as a USB connector, etc. or connected by a wireless communication such as Bluetooth, etc. Also, the head unit 100 may store information of the vehicle including vehicle identification number (VIN).

The terminal apparatus 200 performs communication with the vehicle center server 300, downloads an application from the vehicle server 300 and executes it. The terminal apparatus 200 checks the information of the head unit 100 through the application. The terminal apparatus 200 executes a user interface corresponding to the checked information of the head unit 100. For this, the terminal apparatus 200 may include a communicator 210, an input 220, an output 230, a storage 240, and controller 250.

The communicator 210 performs communication with the head unit 100 and the vehicle center server 300. For this, the communicator 210 may perform the wireless communication such as Bluetooth, etc. and the wired communication such as USB cable, etc.

The input 220 generates an input signal for controlling the terminal apparatus 200 by an outside input and sends to the controller 250. The input 220 may be formed by a keypad, a touch pad, a touch screen, etc., and if input 220 is formed by a touch screen, the input 200 may perform the role of output 230 simultaneously.

The output 230 may display various operations performed in the terminal apparatus 200 by a control of the controller 250. The output 230 outputs the application and outputs the user interface corresponding to the information of the vehicle and the information of the head unit 100.

The storage 240 may store a program for various operations performed by the terminal apparatus 200, and store the information of the vehicle and the information of the head unit 100. The storage 240 may also store the application received from the vehicle center server 300.

The controller 250 checks the information of the head unit 100 by executing the application stored in the storage 240 and executes the user interface corresponding to the checked information. More specifically, the controller 250 connects to the vehicle center server 300 by controlling the communicator 210 by the input 220. The controller 250 downloads the application from the vehicle center server 300 depending on an application download signal received from the input 220 and executes it.

The controller 250 receives user information (ID and password) of the driver for executing the application installed from the input 220. If the terminal apparatus 200 and the head unit 100 are the connected state when the user information is inputted, the controller 250 receives the information of the vehicle and the information of the head unit 100 from the head unit 100. At this time, the head unit 100 may be connected with the terminal apparatus 200 by a USB connector, Bluetooth communication, etc. The vehicle information may be information including a unique VIN assigned to the vehicle when the vehicle comes out of a factory. The information of the head unit 100 may be information including a type of the head unit 100 and the connecting method of the terminal apparatus 200 and the head unit 100. If the terminal apparatus 200 and the head unit 100 are not the connected state, the controller 250 receives information of the vehicle and the type of the head unit 100 by the input 220. If a signal notifying the setup completion for using the application is inputted from the input 220, the controller 250 stores the setup information.

The controller 250 executes the application stored in the storage 240 by input of the input 220. The controller 250 receives the ID and the password from the input 220 and performs a login for the application. The controller 250 then checks whether the head unit 100 is connected. If the head unit 100 is connected, the controller 250 checks the method which the terminal apparatus 200 is connected with the head unit 100. According to the connecting method of the terminal apparatus 200 and the head unit 100, the format of the data transmitted and received when connecting the terminal apparatus 200 and the head unit 100 varies. The controller 250 extracts the user interface and a provision function corresponding to the data format and executes it. If the head unit 100 is not connected, the controller 250 connects to the vehicle center server 300 and checks the type of the head unit 100 and the information of the vehicle which previously transmits to the vehicle center information 300.

The controller 250 extracts the user interface and the provision function corresponding to the checked information of the vehicle and the type of the head unit 100 and executes it.

The vehicle center server 300 provides the terminal apparatus 200 with the application. The vehicle center server 300 stores the information including the login information (ID and password) inputted from the driver through the application, the information of the vehicle (VIN), the type of the head unit 100 and the connecting method between the head unit 100 and the terminal apparatus 200. At this time, the application is the application capable of checking the status information for various devices collected by the head unit 100. The application includes a plurality of user interfaces corresponding to information of the protocol used depending on the type of the head unit 100, the data format depending on the connecting method of the head unit 100, etc. and separate functions provided to the driver for each interface.

Figure 3:
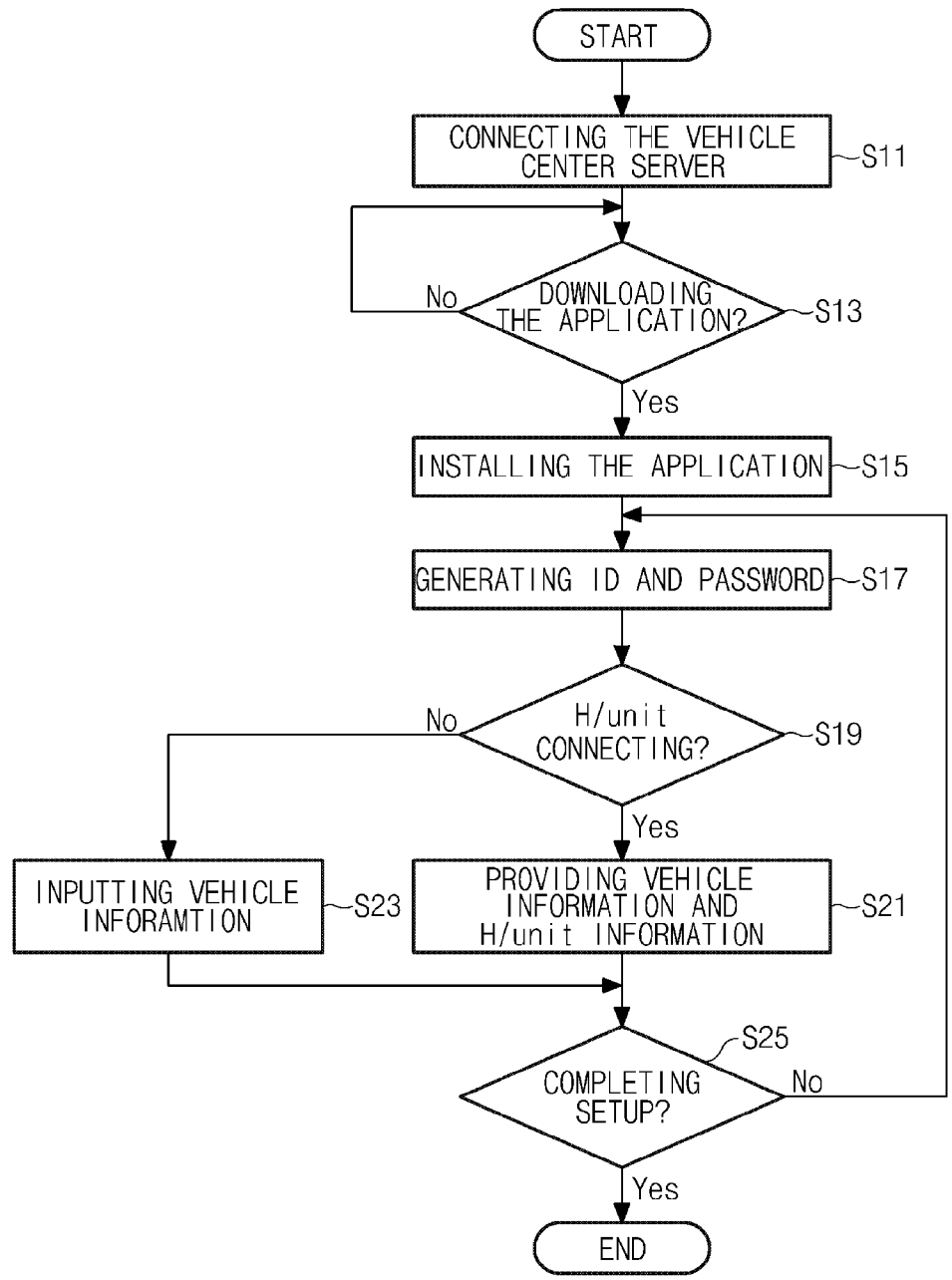
FIG. 3 is a flow chart explaining a method for setting head unit information of a vehicle according to an embodiment of the present disclosure.

FIG. 3 is a flow chart explaining a method for setting head unit information of a vehicle according to an embodiment of the present disclosure.

Referring to FIGS. 1 to 3, at step S11, the controller 250 connects the vehicle center server 300. At step S13, the controller 250 connecting to the vehicle center server 300 checks whether an application download signal is received from the input 220. At step S13, if the application download signal is received, the controller 250 proceeds to step S15, and if the download signal is not received, the controller 250 waits for the reception of the download signal. At this time, the application is capable of checking status information for various devices collected by the head unit 100, and may provide a separate interface according to the connecting method of the head unit 100 and the terminal apparatus 200.

At step S15, the controller 250 downloads the application from the vehicle center server 300 and stores it, and installs the application. At step S17, the controller 250 receives driver's information (ID and password) for executing the application installed from the input 220.

At step S19, the controller 250 checks whether the head unit 100 is connected. As the checking result of step S19, if the terminal apparatus 200 and the head unit 100 are connected, the controller 250 proceeds to step S21, and if the terminal apparatus 200 and the head unit 100 are not connected, the controller 250 proceeds to step S23. At this time, the terminal apparatus 200 and the head unit 100 may be connected by a USB connector, Bluetooth communication, etc.

At step S21, the controller 250 receives information of the vehicle and information of the head unit 100 from the connected head unit 100, transmits the information to the vehicle center server 300 and proceeds step S25. The information of the vehicle may include a unique VIN assigned to the vehicle when the vehicle comes out of the factory. The information of the head unit 100 may include a type of the head unit 100 and the connecting method of the terminal apparatus 200 and the head unit 100.

At step S23, the controller 250 receives the type of head unit 100 not connected and the information of the vehicle through the input 220, transmits them to the vehicle center server 300, and proceeds to step S25. The controller 250 provides the type of the head unit 100 to the vehicle center server 300, and may check the type of the protocol used when the head unit 100 is connected to the terminal apparatus 200.

At step S25, if the controller 250 receives the signal notifying the completion of the setup for using the application from the input 220, the process is terminated. If the signal is not received, the process returns to step S17 and carries out the above steps again.

Figure 4:
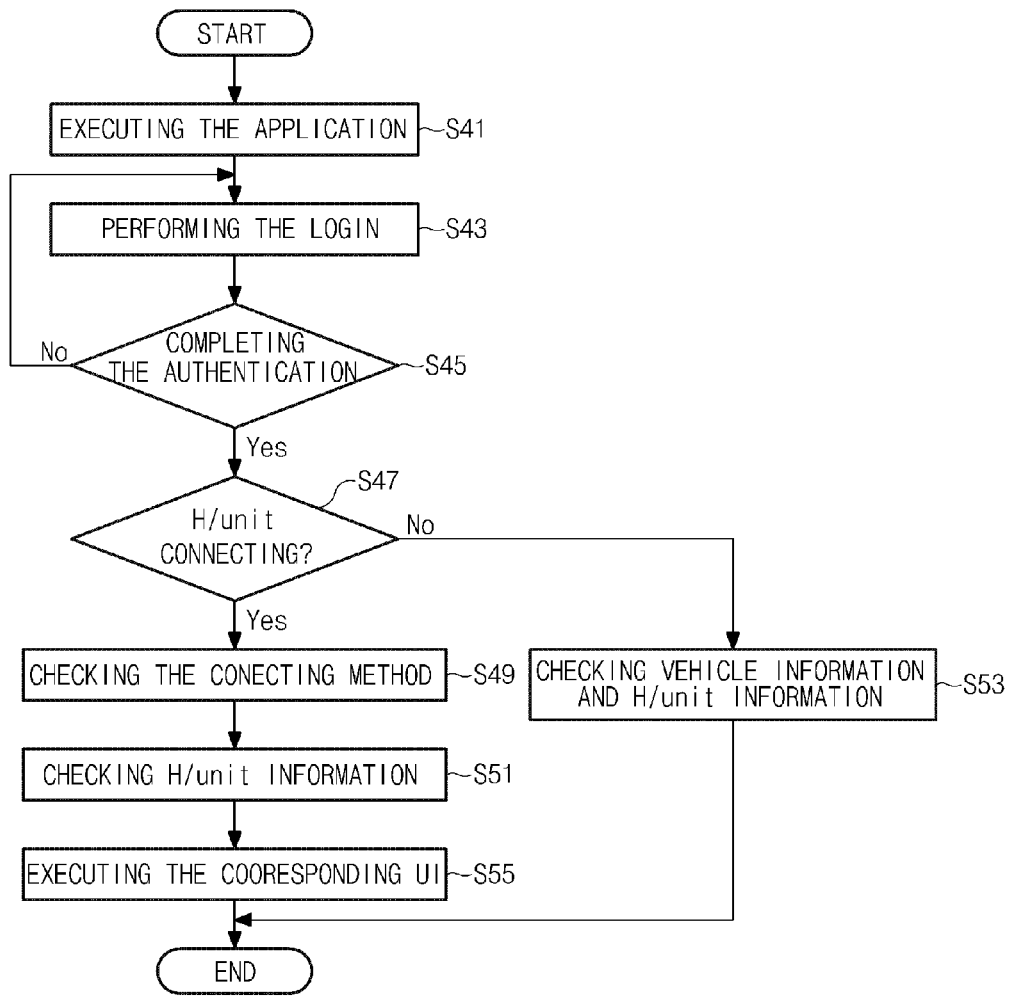
FIG. 4 is a flow chart explaining a method for executing a user interface depending on a head unit according to an embodiment of the present disclosure.

FIG. 4 is a flow chart explaining a method for executing a user interface depending on a head unit according to an embodiment of the present disclosure.

Referring to FIGS. 1 through 4, at step S41, the controller 250 executes the application stored in the storage 240 by the input of the input 220. At step S43, the controller 250 receives the ID and the password generated at step S17 from the input 220, and performs the login for the application. At step S45, the user authentication is completed with the input ID and password, and then the controller 250 proceeds to step S47. At step S47, the controller 250 checks whether the head unit 100 is connected. If the head unit 100 is connected, the controller 250 proceeds to step S49, if the head unit 100 is not connected, the controller 250 proceeds to step S53.

At step S49, the controller 250 checks the connecting method of the terminal apparatus 200 and the head unit 100 and proceeds to step S51. At step S51, the controller 250 checks the information of the connected head unit 100 and proceeds to step S55. When the head unit 100 is connected to the terminal apparatus 200, they are connected by a USB connector or by a Blue tooth communication, and a format of data transmitted and received when connecting the terminal apparatus 200 and the head unit 100 varies according to the connecting method. Thus, at step S55, the controller 250 extracts and executes a user interface and a provision function corresponding to the data format varied depending on the checked connecting method.

If the head unit 100 is not connected at step S53, the controller 250 connects to the vehicle center server 300, checks the type of the head unit 100 in the information of the vehicle and the information of the head unit 100 provided to the vehicle center server 300 in step S23 of FIG. 3, and proceeds to step S55.

A terminal apparatus and a method for connecting with a head unit of a vehicle according to the present disclosure have been described through embodiments. The exemplary embodiment is disclosed in the specification and drawings, although specific terms are used, but it is only used as a general meaning for easily explaining the technical details and helping understanding for the present disclosure, and it is not intended to limit the scope of the present disclosure. In addition to the above described embodiments, it will be apparent to the ordinary skilled in the art that another modified examples based on the technical spirit of the present disclosure can be embodied.

What is claimed is:

1. A terminal apparatus for connecting with a head unit of a vehicle, the apparatus comprising:
    a communicator configured to perform communication with the head unit equipped in the vehicle and a vehicle center server;
    a storage configured to download an application from the vehicle center server and store it; and
    a controller configured to check information of the head unit by executing the application, to check information of the vehicle and a type of the head unit previously stored in the vehicle center server if the head unit is not connected, check a protocol type according to the type of the head unit, and to execute a user interface corresponding to the checked information.

2. The terminal apparatus for connecting with the head unit of the vehicle according to claim 1, wherein the controller checks the information of the vehicle including vehicle identification number (VIN) of the vehicle.

3. The terminal apparatus for connecting with the head unit of the vehicle according to claim 2, wherein the controller checks the information of the head unit including the type of the head unit and a connecting method with the head unit.

4. The terminal apparatus for connecting with the head unit of the vehicle according to claim 3, wherein the controller checks the protocol type according to the type of the head unit, and checks a data format according to the connecting method with the head unit.

5. The terminal apparatus for connecting with the head unit of the vehicle according to claim 4, wherein the controller executes a user interface corresponding to the information of the vehicle, the protocol type and the data format.

6. The terminal apparatus for connecting with a head unit of a vehicle according to claim 5, wherein the user interface provides a separate function according to the protocol type and the data format.

7. A method for connecting with a head unit of a vehicle comprising steps of:
    executing an application downloaded from a vehicle center server by a controller;
    performing a login for the application;
    checking information of the head unit;
    executing a user interface corresponding to the checked information;
    checking information of the vehicle and a type of the head unit previously stored in the vehicle center server if the head unit is not connected; and
    checking a protocol type according to the type of the head unit.

8. The method for connecting with the head unit of the vehicle according to claim 7, wherein the step of checking the information of the head unit comprises steps of:
   checking whether the head unit is connected;
   checking the connecting method of the connected head unit if the head unit is connected; and
   checking a data format according to the connecting method.

9. The method for connecting with the head unit of the vehicle according to claim 7, wherein before the step of executing the application, the method comprises steps of:
   connecting to the vehicle center server and downloading the application;
   installing the application and generating login information; and
   transmitting the information of the vehicle and the information of the head unit.

* * * * *